UNITED STATES PATENT OFFICE.

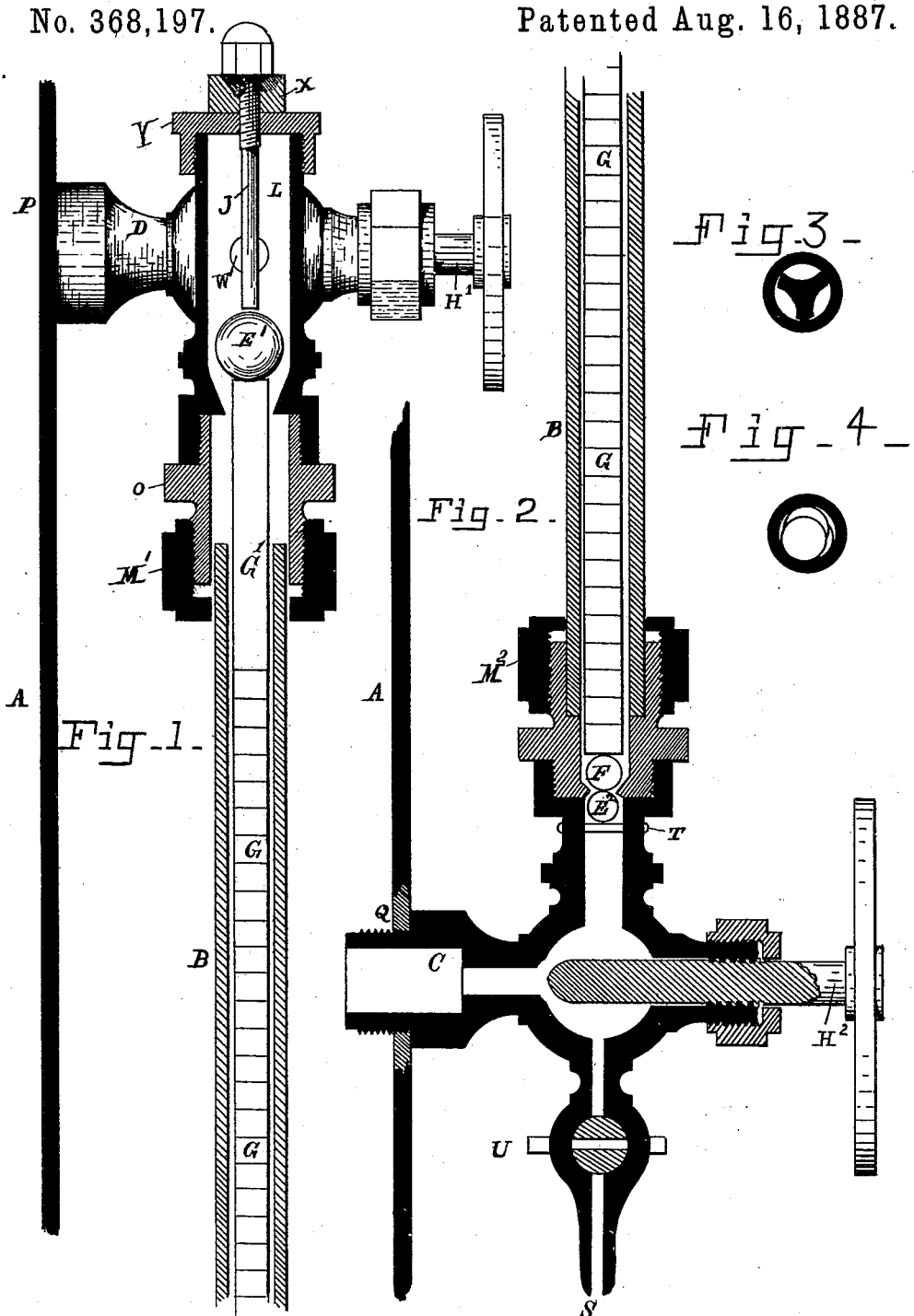

FRANK ARTHUR DRUMMOND, OF WINNIPEG, MANITOBA, CANADA.

WATER-GAGE FOR STEAM-BOILERS.

SPECIFICATION forming part of Letters Patent No. 368,197, dated August 16, 1887.

Application filed April 13, 1887. Serial No. 234,566. (No model.)

*To all whom it may concern:*

Be it known that I, FRANK ARTHUR DRUMMOND, a subject of the Queen of Great Britain and Ireland, residing in the city of Winnipeg, in the county of Selkirk, in the Province of Manitoba, and Dominion of Canada, have invented certain new and useful Improvements in Water-Gages for Steam-Boilers, of which the following is a specification.

The ordinary water-gage, which visibly shows the height of the water in steam-boilers at or about its proper level, consists of a vertically-placed glass tube, which is seated and securely packed into metal channels connecting it with the boiler, one at the top and the other at the bottom of the glass, the whole forming a runway on the exterior of the boiler, so that the water appears standing in the glass at the same level as in the interior of the boiler. This glass is liable to breakage, either from the outside or by overpressure from the inside, and various expedients have been adopted, first, to form metal guards around the glass, and, secondly, to check the rush of steam and water should the glass be broken, so as to prevent any accident to the attendant, who, under ordinary circumstances, would have to screw in the check-valves at the top and the bottom of the broken glass.

The object of this invention is not directed to the protection of the glass so much as to the effectual and automatic closing of the ports to the boiler simultaneously with the breaking of the glass, thus instantly preventing the escape of scalding water and steam. At the same time the arrangement which is shown in this invention will permit the engineer or attendant to blow off and clear the glass, just as he would do in any ordinary glass water-gage.

I attain the foregoing objects by the mechanism illustrated in the accompanying drawings, in which—

Figure 1 is a vertical section of the upper portion of the water-gage as it appears attached to the boiler. Fig. 2 is a vertical section of the lower portion of the water-gage, forms a continuation of Fig. 1, and is sectioned in the same line and plane as that figure. Figs. 3 and 4 are sections across the glass tube, showing the internal glass supports which form the primary arrangement in this invention.

Similar letters of reference indicate similar parts throughout the several views.

A is the steam-boiler.

D is the upper brass of the gage screwed into the boiler at P, and C is the lower brass of the gage screwed into the boiler at Q.

B is the glass indicator-tube, which is seated into the upper brass by means of the screw packing-nut M', and into the lower brass by means of the screw packing-nut $M^2$. The nut M' is not directly attached to the upper brass, but to an intermediate screwed sleeve, O, for the purpose of facilitating the removal of the glass indicator-tube or its insertion into the brasses.

$E^2$ is the lower glass-ball valve, which rests off its seat on the pin T, and is surmounted by another glass ball, F. Resting on these balls $E^2$ and F are a number of short supporting-glasses, G G G, which are confined within the glass indicator-tube B, and are continued throughout nearly its entire length. These supporting-glasses are surmounted by a longer glass piece, G', and this in turn is surmounted by the upper glass-ball valve E'. There must be a sufficient quantity of these supporting-glasses inserted or dropped into the glass indicator-tube to support the glass-ball valve E' in an unseated position, as shown in Fig. 1. It is necessary that these supporting-glasses G G G must not only be in short lengths, but must also be of such a shape that there will be a ready passage for the water between them and the sides of the glass indicator-tube B. A preferable form is shown in Fig. 3, and glass balls, as appear in Fig. 4, may be used so long as they are of smaller diameter than the tube, and in sufficient number to keep the glass-ball valves out of their seats. Now, the object of this arrangement of glass-ball valves, as the first portion of my invention, is simply explained: That if the glass indicator-tube breaks, either from an exterior blow or interior overpressure, the instant it goes to pieces the intervening supporting-glasses of course fall out and the pressure of the steam in the boiler drives the glass-ball valves E' and $E^2$ into their seats, and thus instantly and effectually prevents any outflow from the boiler.

As to the second portion of my invention, it is necessary to state that in other gages there have been glass-ball valves used so as to close the ports to the boiler automatically; but it has been found impossible for the engineer to blow off or clear the indicator-glass, as the balls which were placed in the horizontal channels of the brasses immediately closed the ports if the pressure were removed by a blow-off cock being opened beyond them and the boiler.

In this gage the valves, being kept open by the intervening supports G G G, are in no way affected by the rush of the steam or water through the blow-off cock U, which is shown shut-off-wise in the drawings. In fact, in any gage using valves the particles of scale and dirt which usually permeate boiler-water are very apt to clog and render the action of the valves useless and the indicator-tube dull and opaque, unless the glass can be blown off. In this gage the interior may be cleaned of any dirt accumulations by screwing in the lower check-valve, $H^2$, against its seat, when the steam may be blown off through the upper channel, W, clear through the entire gage, making its exit at S.

Both the upper and lower brasses are so designed and constructed as to be best suited for this peculiar combination of devices. The glass indicator-tube can be readily taken out or put in place by unscrewing the upper end of the interior sleeve, O, the glass filling the vacancy in the sleeve as the sleeve descends over the glass. The lower packing-nut, $M^2$, may then be released and the glass lifted out. Before removing the glass indicator-tube and the portions of the brasses connecting it, the upper glass-ball valve, E', must be freed by screwing out the pin J, which is held in place by a jam-nut, X. Then the upper supporting-piece, G', and the glass-ball valve E' may be shoved up, so as to allow the glass indicator-tube B to be removed. This operation will require the removal of the screw-cap Y, when the whole chamber L will be exposed. The whole may be replaced in the same way, the last supporting-piece G' being dropped through the top of the chamber L and then surmounted by the upper glass-ball valve, E', after which the cap Y may be screwed on and the pin J screwed down so as to hold the upper glass-ball valve loosely in position.

The upper supporting-glass piece, G', it will be noticed, is made longer than the pieces underneath it, as short pieces in falling down might engage with the upper end of the glass indicator-tube and thus prevent the glass-ball valve E' from falling into its seat.

In this gage the distance of the brasses apart can be fixed to any length of glass required.

It will be noticed that the channel from the boiler to the upper portion of the gage enters at W in the side of the chamber L, and that the upper check-valve, H', is placed in this channel, so that there is by this means a full opening into the chamber.

Throughout this specification the names occur as follows: "Supporting-glasses," "glass balls," "glass ball valves;" and it may be here stated that they are not thus termed from their relation to the glass indicator-tube, but that the material of which they are constructed is glass, this material being preferably used not only from its non-liability to surface adhesion of dirt, but from its transparency in affording a clear view of the water-level.

In the drawings the upper check-valve, H', being in rear of the main sectioning of the drawings, is not sectioned, but is of the same construction and section as the lower check-valve, $H^2$.

In Fig. 4 the supporting glass balls are shown randomwise, as they might appear when looking down the section of the indicator-tube.

What I claim as my invention is as follows:

1. In a water-gage for steam-boilers for automatically closing its ports to the boiler on the breakage of the glass, an under glass-ball valve off its seat supported in the vertical channel of the gage and below the glass indicator-tube, a series of glass-supports resting upon the under glass-ball valve and passing pillarwise through the glass indicator-tube, and an upper glass-ball valve in the vertical channel of the gage above the glass indicator-tube, supported off its seat on the top of this series of glass-supports, substantially as described, and for the purposes set forth.

2. In a water-gage for steam-boilers for automatically closing its ports to the boiler on the breakage of the glass, a blow-off cock, U, a lower check-valve, $H^2$, an under glass-ball valve off its seat supported in the vertical channel of the gage and below the glass indicator-tube, a series of glass-supports resting on the under glass-ball valve and passing pillarwise through the glass indicator-tube, an upper glass-ball valve in the vertical channel of the gage above the glass indicator-tube, supported off its seat on the top of this series of glass-supports, and an upper check-valve, H', substantially as described, and for the purposes set forth.

FRANK ARTHUR DRUMMOND.

Witnesses:
A. VASS,
A. G. YUILL.